E. LOCKE.
CONVEYING APPARATUS.
APPLICATION FILED MAR. 30, 1911.
1,015,570.
Patented Jan. 23, 1912.
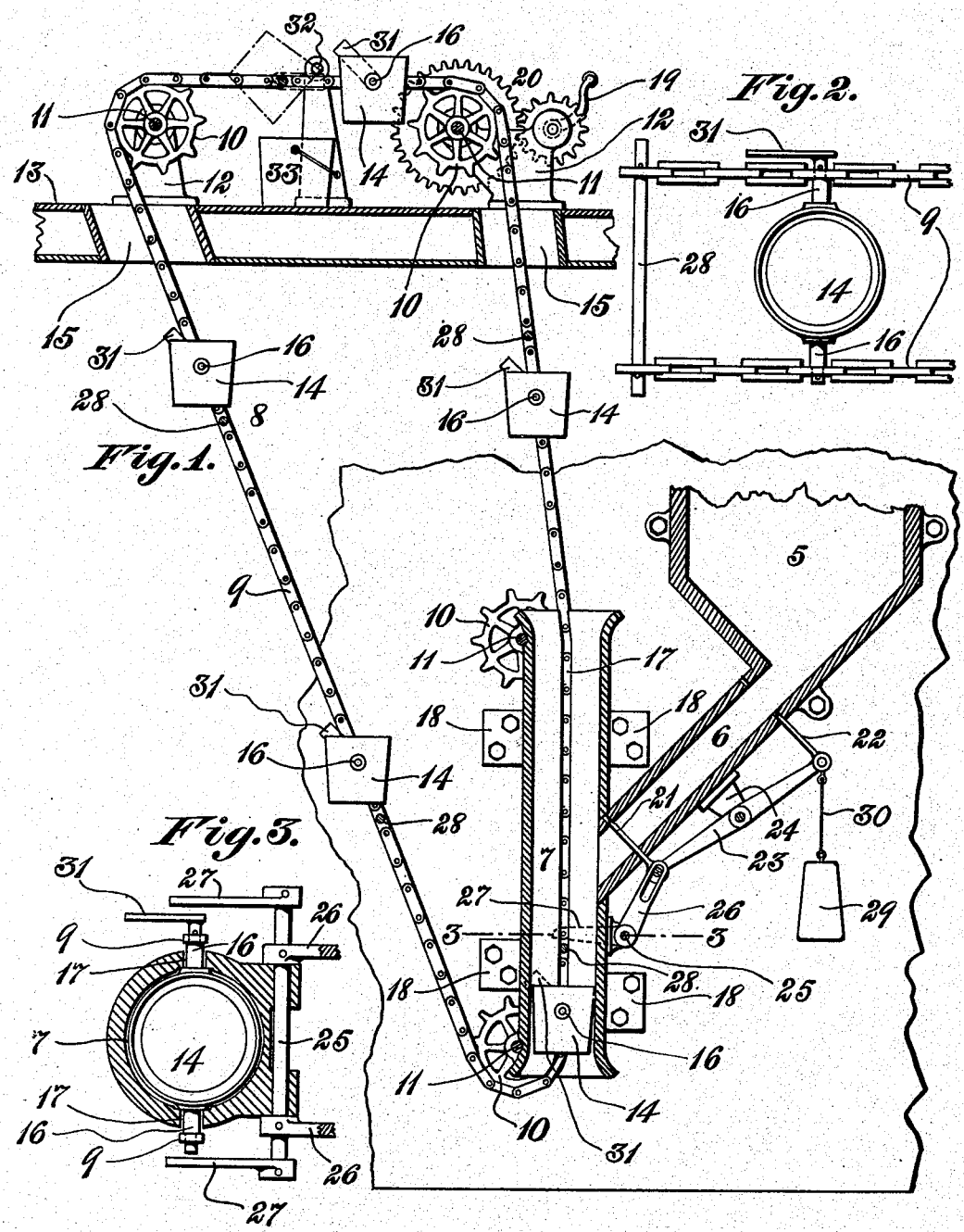
Witnesses:
Geo. Griswold
L. L. Markel
Inventor:
Edward Locke
By his Attorneys,
Sutherland & Anderson

UNITED STATES PATENT OFFICE.

EDWARD LOCKE, OF CLIFTONDALE, MASSACHUSETTS.

CONVEYING APPARATUS.

1,015,570. Specification of Letters Patent. Patented Jan. 23, 1912.

Application filed March 30, 1911. Serial No. 617,805.

*To all whom it may concern:*

Be it known that I, EDWARD LOCKE, a subject of the King of Great Britain, residing at Cliftondale, in the county of Suffolk and State of Massachusetts, have invented certain new and useful Improvements in Conveying Apparatus, of which the following is a specification.

This invention relates to conveying apparatus, the object of the invention being to provide a simple and effective apparatus of this character which is adapted to transport material from one point to another.

Apparatus involving my invention can be used with advantage in many different connections; for example it may be employed for carrying coal from a cellar or other storage compartment to a kitchen or other room.

In the drawings accompanying and forming part of the present specification I have shown in detail one convenient form of embodiment of the invention which to enable those skilled in the art to practice the same will be set forth fully in the following description, while the novelty of the invention will be included in the claims succeeding said description. I do not restrict myself to the disclosure made, as I may depart therefrom in several respects within the scope of my invention included in said claims, said disclosure being provided primarily to enable those skilled in the art to practice the invention.

Referring to said drawings: Figure 1 is a side elevation of conveying apparatus including my invention. Fig. 2 is a top plan view of a part of the carrier or conveyer. Fig. 3 is a horizontal section on the line 3—3 of Fig. 1.

Like characters refer to like parts throughout the several figures of the drawings.

The apparatus as already intimated can be used for a variety of purposes, and I have indicated one of these.

As a suitable means for initially receiving the material to be transported a bin or hopper as 5 may be provided and the coal or other material can be discharged into this bin or hopper which is shown provided with a depending inclined spout 6 along which the coal or other material is adapted to gravitate and to be directed thereby into the duct or tube 7 hereinafter more particularly described. This duct or tube may be of any suitable shape, although it is represented as being substantially cylindrical, its opposite ends being shown flared outward. The spout 6 is connected with and opens into one side of the duct or tube between the top or bottom thereof as shown, although this arrangement is not essential. It is desirable, however, in that the liability of dust escaping at the junction between the spout and tube, is avoided.

There is preferably provided a carrier or conveyer, and a carrier such as that denoted in a general way by 8 satisfactorily meets this condition. The carrier is illustrated as consisting of parallel sprocket chains 9 passing around sprocket wheels 10 arranged in pairs, the supporting shafts for said sprocket wheels being designated by 11. The two upper shafts are supported by brackets or bearings 12 on the floor 13, while the shafts for the two lower pairs of sprocket wheels are supported by bearings on the conduit or tube 7 near the bottom and top thereof. The carrier or conveyer travels through the conduit or tube 7 for a purpose that will hereinafter appear, and it supports for oscillation receptacles or buckets as 14, the floor 13 having openings or holes as 15 for the passage of the carrier and the buckets or receptacles 14 supported thereby. The said buckets 14 are shown provided with laterally extending journals or gudgeons 16 which extend through oppositely alined links of the parallel chains 9 and thereby provide for the necessary rocking motion of the said buckets 14. The bearings or standards 12 are separated from each other and in the space or interval between the same as will hereinafter appear the buckets are discharged of their contents.

The conduit or duct 7 has diametrically opposite longitudinal slots 17 and the journals 16 travel through these slots on the movement of the carrier 8. The tube 7 consists in the present case of two complemental sections separated from each other to provide for said slots or passage ways 17 and said tube sections can be connected with brackets 18 fastened to the wall of the cellar, and the hopper or bin 5 can be also connected with said wall as shown.

It will be understood that the buckets or receptacles 14 traverse the conduit or duct 7, in the present case entering said conduit from the lower end and leaving the same from the upper end and each bucket while it is in the duct receives a supply of material received from the bin 5, and this supply as will hereinafter appear is automatically effected.

It is not a matter of consequence how the carrier 8 be operated; this result can be effected by hand or power, a hand crank 19 being shown for this purpose, and its shaft being connected by gearing denoted in a general way by 20 with the upper right shaft 11. On turning the crank 19 in the proper direction, the carrier 8 will be caused to travel so as to move the buckets 14 through the conduit or tube 7, upward through the right opening 15 and downward through the left opening 15. It will be understood that the buckets as they pass through the opening 15 on the right are filled and as they pass through the opening on the left, they are empty, being discharged of their contents between said two openings, and means are provided as will hereinafter appear for effecting such discharge.

In connection with the spout 6 or its equivalent, I provide a pair of alternately operative valves as 21 and 22, and these valves may be of any suitable construction. They are shown movable through openings in the lower wall of the spout 6 and as pivoted to the rocker 23 fulcrumed between its ends to the bearing 24 on the outside of the bottom of said spout. The valve or gate 21 is shown in its operative position, while the valve 22 is in its inoperative position, so that a mass of material can pass from the hopper or bin 5 and along the spout 6 to said valve 21 to be held by the latter until the valve 22 is closed. When the valve 22 is closed, the material will be held back at a higher point, it being understood that as the valve 22 closes, the valve 21 is opened so that the material which rested against the lower valve 21 can pass from the spout 6, into the tube 7 and be directed by the latter into a bucket in the said tube, the parts being so timed that the valve 21 will be opened and the valve 22 closed when a bucket is below the mouth of the spout 6 so as to properly direct the material into the said bucket.

One of the sections of the tube 7 or that on the right in Fig. 1 is provided with bearings for supporting for rocking motion the shaft 25 which has rigid outwardly projecting arms 26 loosely connected with the rocker 23 at about the junction of the lower valve 21 therewith. The shaft 25 is also provided with a pair of rigid inwardly extending arms 27 disposed in the path of operating means connected with the carrier 8 and which operating means may as shown consist of rods 28 extended through alined links of the chains 9, there being a rod 28 arranged a short distance in advance of each bucket 14. The ends of said rod project outward beyond the chains 9 and serve to swing the arms 27 upward in a direction to open the valve 21 and to simultaneously close the valve 22. Each rod 28 is so positioned in practice with respect to the bucket 14 immediately back of it that when said bucket has fully entered the tube 7 as shown in Fig. 1, the ends of said rod 28 will strike the arms 27, lift and then ride off said arms. As the arms 27 are thus lifted, the valve 21 will be opened and the valve 22 simultaneously closed so as to cause the direction of a charge of material into said bucket, the charge being practically measured. The closing of the valve 21 and the opening of the valve 22 is effected preferably in an accelerated manner, and for this purpose the weight 29 may be provided, said weight being connected as by the connector 30 with the outer end of the rocker 23, by virtue of which the instant that a rod 28 passes out of contact with the arms 27, the valve 21 will be closed in a rapid manner, while the valve 22 will be equally rapidly opened.

One journal 16 of each of the buckets 14 is provided with a projection 31, and the fixed pin 32 is arranged in the path of these projections, so that as the carrier or conveyer 8 moves, the said projections 31 will successively come against said pin 32 or analogous device and will swing the buckets about their axes so that their contents can be discharged into a receiver as 33. The pin 32 may be located at any suitable place, although it is shown between the bearings 12 by reason of which the receiver 33 can be placed on the floor 13 and in position to receive the contents of a bucket 14 from a point above the same.

As will be gathered from what I have already stated, I do not restrict myself to the construction hereinbefore described. I may depart therefrom in several different ways. For example the duct or tube 7 is shown as circular in cross section, while the buckets are of similar shape. Neither of these is a matter of consequence. In like manner I may employ entirely different discharge controlling means.

I desire to call attention to the fact that the parts are very compactly arranged; coal and similar materials can be handled without waste. It is, of course, not essential that the material being handled be carried from a lower to a higher level as this relation might be reversed. The tube 7 or its equivalent is of great advantage in that it effectually prevents scattering of the material while the same is being supplied in charges in the buckets on the endless carrier, such advantage in the present case being obtained by having the buckets comparatively closely fitting the tube through which they travel.

In some of my claims I will make reference to the fact that the carrier 8 moves through the tube 7. By this I do not mean that the whole carrier need move through the tube, as the chains 9 do not actually pass through the tube, but the connecting rods 28 constituting part of said carrier do pass through the tube.

What I claim is:

1. In an apparatus of the class described, the combination of a tube comprising sections separated from each other to provide slots, a pair of endless chains, buckets connected with said chains, movable through said tube by said chains, the connections between the buckets and the chains extending through said slots and the buckets approximately closely fitting the tube, and means for supplying charges of material to the buckets while they are in said tube.

2. In an apparatus of the class described, the combination of a tube comprising two sections separated from each other to provide slots, a pair of chains and cross bars connecting said chains, the chains and cross bars constituting a carrier and the chains being movable to cause the cross bars to traverse said slots, swinging buckets supported by said cross bars and movable through and approximately closely fitting said tube, and means for supplying charges of material to the buckets while they are in said tube.

3. In an apparatus of the class described, the combination of a tube comprising sections separated from each other to provide slots, a pair of chains, buckets connected with and movable through said tube by said chains, the connections between the buckets and the chains extending through said slots and the buckets approximately closely fitting said tube, a chute for delivering material into said tube, a pair of valves for controlling the flow of the material from said chute, and means governed by said chains for effecting the action alternately of said valves.

In testimony whereof I affix my signature in presence of two witnesses.

EDWARD LOCKE.

Witnesses:
    FREDERICK E. ANDERSON,
    HEATH SUTHERLAND.

---

Copies of this patent may be obtained for five cents each, by addressing the "Commissioner of Patents, Washington, D. C."